United States Patent [19]

Reese

[11] 4,126,435
[45] Nov. 21, 1978

[54] APPARATUS FOR REMOVING FINELY DIVIDED SOLIDS FROM GAS

[75] Inventor: Richard G. Reese, Woodside, Calif.

[73] Assignee: Combustion Power Company, Inc., Menlo Park, Calif.

[21] Appl. No.: 722,559

[22] Filed: Sep. 13, 1976

Related U.S. Application Data

[63] Continuation-in-part of Ser. No. 510,291, Sep. 30, 1974, Pat. No. 4,017,278.

[51] Int. Cl.² ............................................. B01D 46/34
[52] U.S. Cl. ........................................ 55/474; 55/518
[58] Field of Search .................... 55/98, 99, 329, 330, 55/474, 479, 512, 515, 518, 390; 34/174; 23/288 G, 288 K

[56] References Cited

U.S. PATENT DOCUMENTS

| | | | |
|---|---|---|---|
| 1,570,869 | 1/1926 | Thomson et al. | 55/99 |
| 1,871,166 | 8/1932 | Fahrbach | 55/512 |
| 1,995,292 | 3/1935 | Clark | 55/474 |
| 2,488,493 | 11/1949 | Evans | 55/474 |
| 3,652,231 | 3/1972 | Greenwood et al. | 23/288 G |
| 3,800,508 | 4/1974 | Zenz | 55/479 |
| 3,920,427 | 11/1975 | Lachnit | 55/479 |
| 3,982,326 | 9/1976 | Squires | 55/479 |

FOREIGN PATENT DOCUMENTS

| | | | |
|---|---|---|---|
| 794,042 | 2/1936 | France | 55/479 |
| 877,536 | 12/1942 | France | 55/515 |
| 1,497,602 | 10/1967 | France | 34/174 |

Primary Examiner—Frank W. Lutter
Assistant Examiner—David L. Lacey
Attorney, Agent, or Firm—Limbach, Limbach & Sutton

[57] ABSTRACT

Apparatus for separating finely divided solids from gas is described comprising a generally cylindrical vessel having a gas inlet opening and a gas outlet opening, a solids inlet opening at the top of the vessel and a solids outlet opening at the bottom of the vessel. First generally cylindrical wall member having a diameter less than that of the vessel is disposed in the vessel to provide an elongated annular space lying between it and the vessel wall. The first cylindrical wall member is in sealing engagement with the top portion of the vessel. A second generally cylindrical wall member having a diameter less than the first wall member is disposed inside the first wall member to provide an elongated annular space between the two wall members which space is filled with a solid particulate contact material and which moves by gravity flow downwardly through the annular space. The surfaces of both cylindrical wall members are louvered surfaces formed by perforating the walls to form louver vanes inclined to the vertical at an angle of about 15° to 80° and having louver openings sufficiently large that most of the particles constituting the contact mass are capable of passing through the openings. The louver vanes of the first cylindrical wall member extend outwardly and those of the second wall member extend inwardly. Means for controlling the flow of the solid contact material through the louver openings to restrict the flow to a minor proportion of the total contact material and means for facilitating passage of the overflow contact material through a solids outlet opening in the bottom of the vessel are provided.

4 Claims, 8 Drawing Figures

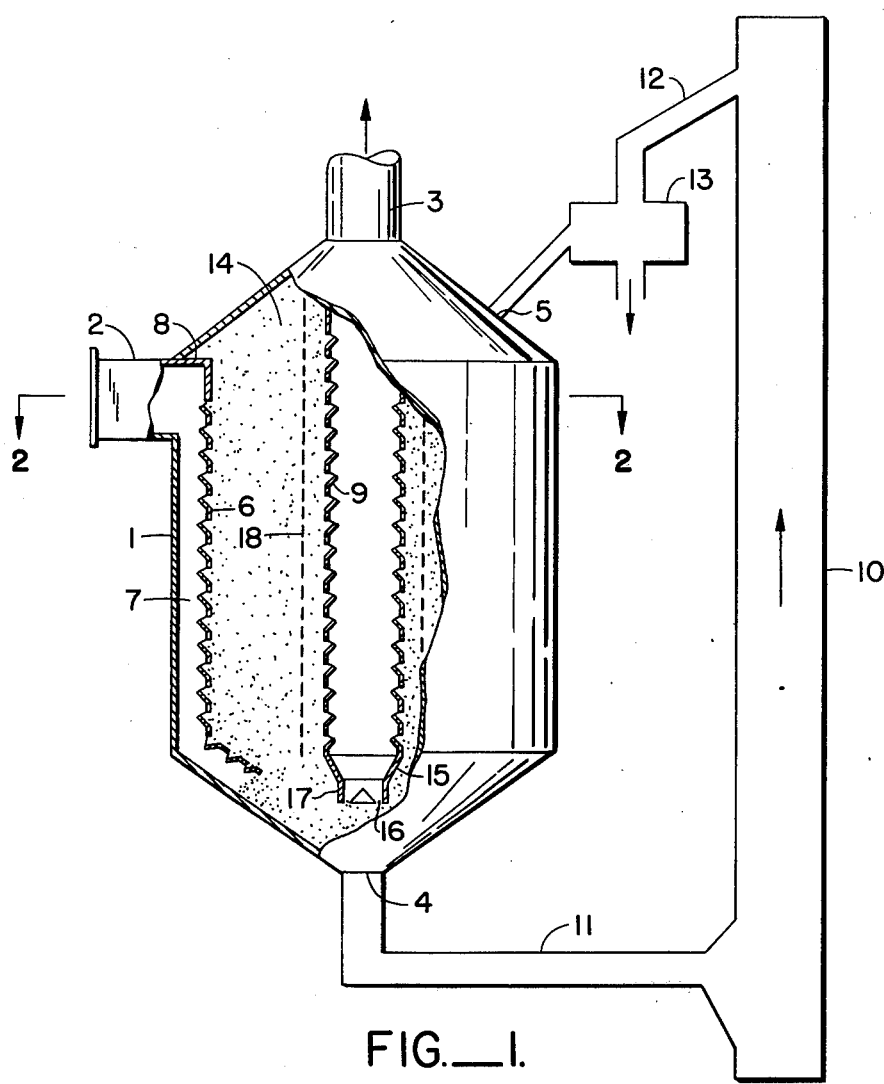
FIG.__1.
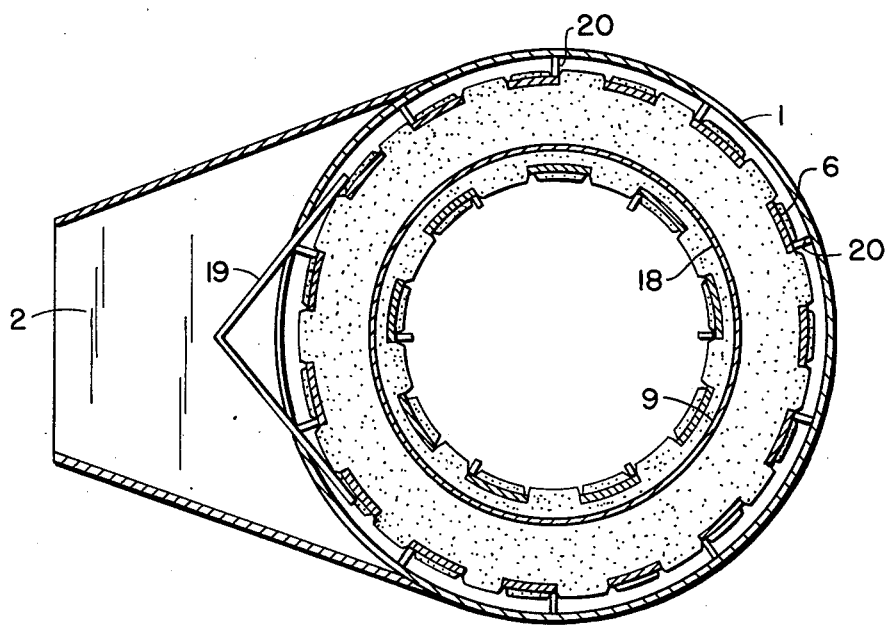
FIG.__2.

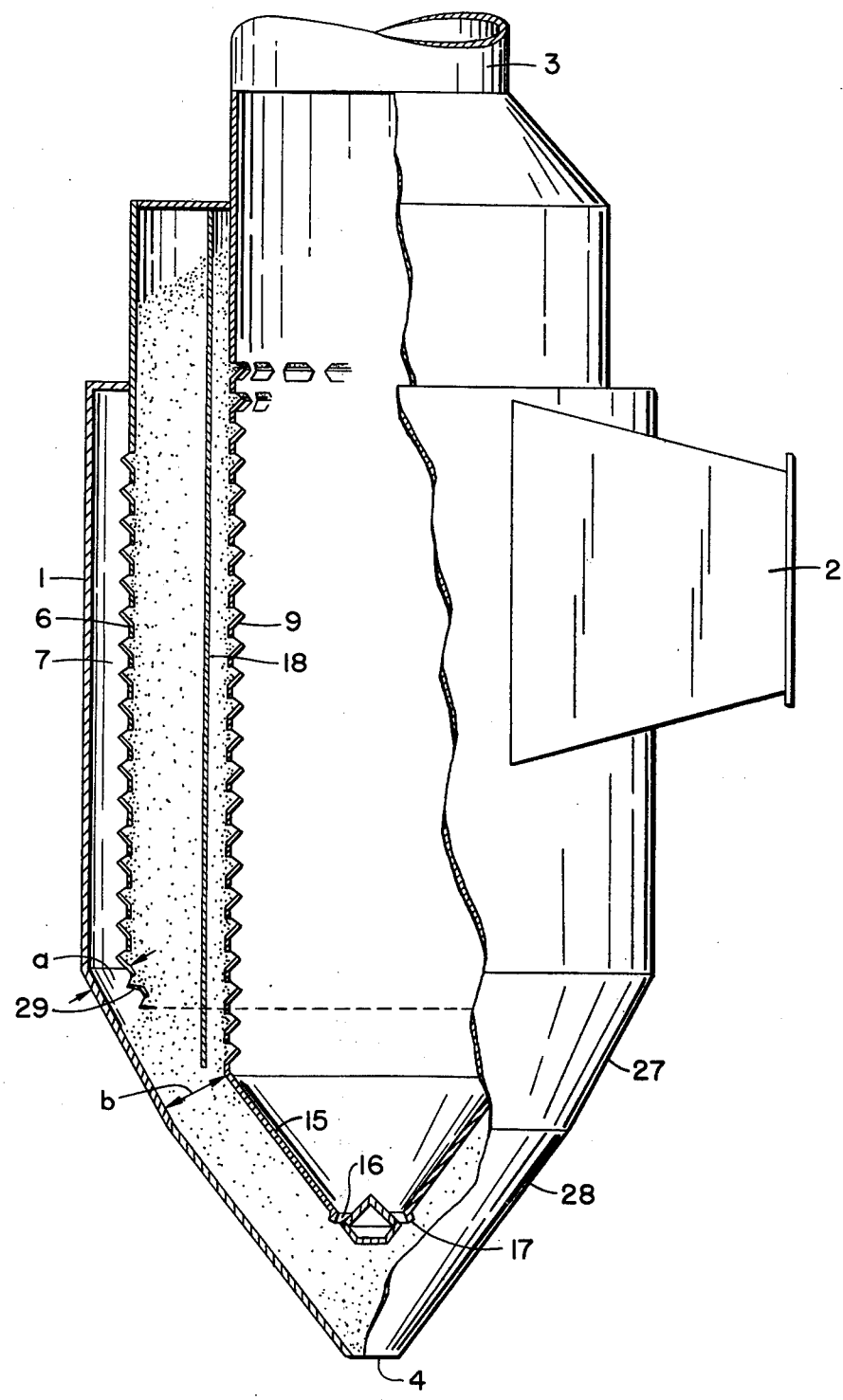
FIG._3.

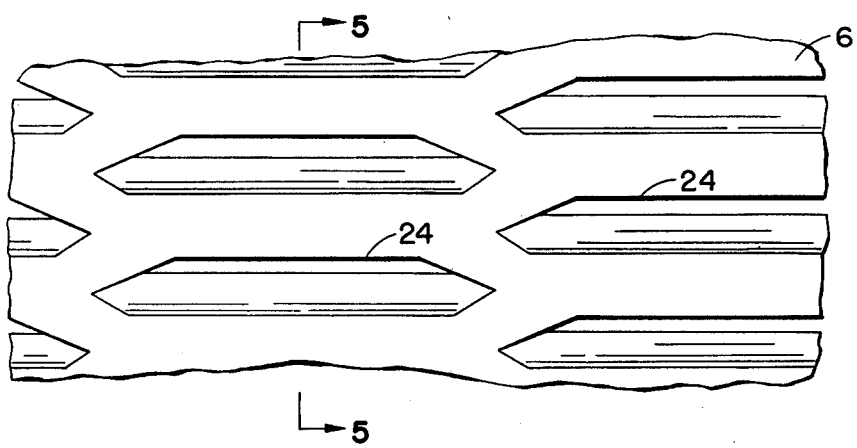
FIG._4.
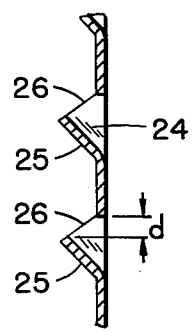
FIG._5.
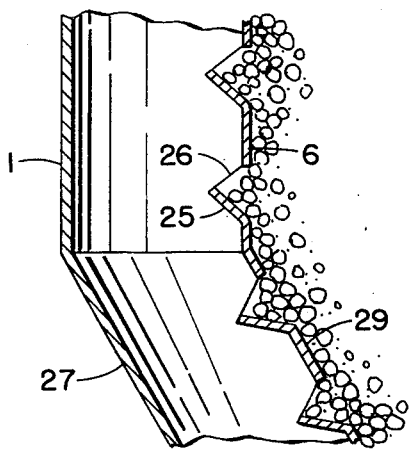
FIG._6.
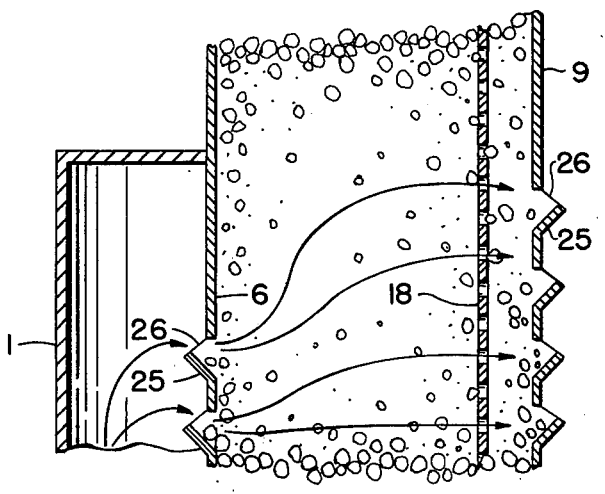
FIG._8.
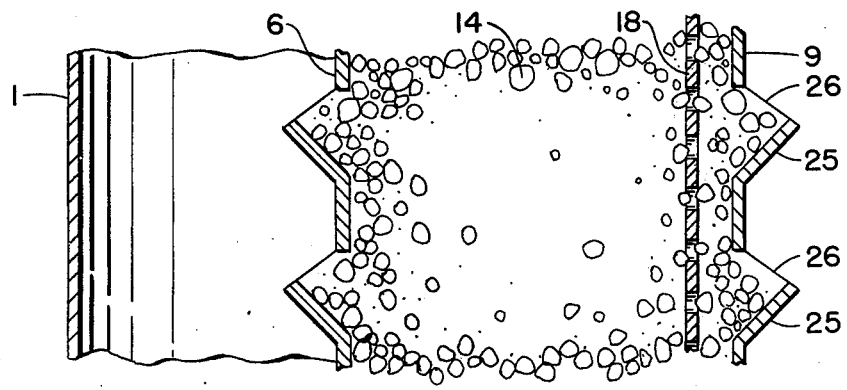
FIG._7.

APPARATUS FOR REMOVING FINELY DIVIDED SOLIDS FROM GAS

This application is a continuation-in-part of application Ser. No. 510,291 filed Sept. 30, 1974, now U.S. Pat. No. 4,017,278, for METHOD AND APPARATUS FOR REMOVING FINELY DIVIDED SOLIDS FROM GAS.

BACKGROUND OF THE INVENTION

The concept of separating entrained solids from gases by passing such gases through a mass of solid particulate material is not a new one. It is described in "Chemical Engineer's Handbook", (Perry, 4th Edition, McGraw-Hill) at pages 20–74. Specific applications of the concept are described in numerous patents. Each of U.S. Pat. Nos. 890,625 to T. A. Edison, 2,493,356 to Mercier et al., 3,220,165 to Howie, 3,594,991 to Berz, 1,995,293 to Clark and French Pat. No. 899,920 show methods and arrangements of apparatus for applying the concept.

Methods and apparatus heretofore descirbed for putting the concept to practical use have been characterized by low operating factors generally attributable to complexity of design or inability to solve the plugging or pressure drop problems caused by accumulations of the entrained solids contained in the feed gas in the apparatus.

DESCRIPTION OF THE INVENTION

The present invention provides a remarkably simple process flow and arrangement of apparatus which permits continuous operation for long periods of time with highly efficient separation of entrained solids, even of sub-micron size, contained in the feed gas.

The method and apparatus of the invention are described with reference to the drawings of which:

FIG. 1 is an elevational view of the separating apparatus with the interior shown in the cut-away portion of the drawing;

FIG. 2 is a horizontal cross-section of the separating vessel shown in FIG. 1 taken along the line 2—2;

FIG. 3 is an elevational view of the separating vessel shown in FIG. 1 with interior detail being shown in the cut-away portion of the drawing;

FIG. 4 is a detail of the louvered cylindrical surface of the wall which contains the mass of particulate material;

FIG. 5 is a cross-section of the louvered cylindrical surface shown in FIG. 4 taken along the line 5—5;

FIG. 6 is a detail of the lower interior of the vessel;

FIG. 7 is a detail of the particulate solid contact material as held by the two louvered cylindrical walls;

FIG. 8 is a detail of the mass of contact material as held by the two cylindrical walls at the top of the vessel.

Referring now to FIG. 1 of the drawings, cylindrical vessel 1, usually having a flat or frusto-conical top and a tapered frusto-conical bottom, has gas inlet 2 disposed in its top, a solids outlet 4 in the bottom, and at least one solids inlet 5 laterally disposed in the top of the vessel. A first cylindrical wall member 6 having a louvered surface and a diameter smaller than that of vessel 1 is concentrically disposed in vessel 1 to leave an annular space 7 between the sidewall of vessel 1 and wall member 6. Cylindrical wall member 6 is sealed at its upper end 8 to the top of vessel 1 to close off annular space 7 at its top. Solid member 8 is attached to the top of wall member 6 and to the frusto-conical top of the vessel and closes the top of annular space 7 against inflow of particulate solid material 14. Annular space 7 is open at its bottom communicating with the frusto-conical bottom of vessel 1. A second cylindrical wall member 9 having a diameter smaller than that of first cylindrical wall member 6 and having a louvered surface is concentrically disposed in first cylindrical wall member 6 to leave an annular space between the two cylindrical wall members which extends from top to bottom of vessel 1. Second cylindrical wall member 9 communicates with gas outlet 3 at the top of vessel 1 and generally extends beyond the top of vessel 1 as a chimney from which treated gas leaves the vessel. The lower end of cylindrical wall member 9 engages a downwardly tapering conical closure 15. Conical closure 15 is slotted at its bottom by slots 16 which are laterally shielded by shielding ring 17. Slots 16 provide communication between the interior of cylindrical wall member 9 and the frusto-conical bottom of vessel 1. A mass of particulate solid contact materials 14 fills the annular space between cylindrical wall members 6 and 9, the top portion of vessel 1 surrounding second cylindrical wall member 9 at its upper end and the frusto-conical bottom of vessel 1 so that the particulate solid material is in open communication with solids outlet 4. A first solid transport means 11 connects solids outlet 4 of vessel 1 with the lower end of exterior elevator 10. Solid transport means 11 may be any conventional solid transport means such as a mechanical vibrating conveyor, a screw conveyor or a belt conveyor. The rate at which transport means 11 is operated can be varied and thus its operation controls the rate at which the solid contact material moves downward in annular space between wall members 6 and 9. Elevator 10 may be any conventional solids conveyor suitable for transporting solids vertically. A conventional bucket elevator provides a simple and dependable vertical transport means. A second solid transport means 12 is provided to convey particulate solid materials from the top of elevator 10 to solids inlet opening 5 in the top of vessel 1. A solids separator 13, capable of separating finely divided solids from the particulate solid contact material, is inserted in the flow path traversed by one or the other of solid transport means 11 or 12. Suitable solids separators include oscillating screen separators which may be either reciprocating or gyratory screens having screens with openings sized to permit passage of the very finely divided material separated from the gas under treatment from the particulate solid contact material which circulates through the system. In the event that the finely divided solids removed from the feed gas are oily or tacky in character, they may be removed from the solid contact material by burning them off or dissolving them instead of mechanically separating them by screening. Third cylindrical wall member 18 is a perforated cylindrical wall having a diameter 2 to 6 inches greater than that of cylindrical wall member 9. The perforations are sized to permit passage of essentially all of the solid contact material particles through them. The third cylindrical wall member is not essential if the solid contact material particles are large, e.g., ⅛-174 inch but is used to control lateral flow of finely divided contact material particles, e.g., 6-8 mesh through the louvre openings of cylindrical wall member 9. The function of cylindrical member 18 is more particularly described with reference to FIG. 7.

FIG. 2 is a cross-section of vessel 1 taken at 2—2. Ribs 20 are strength members which hold first cylindrical wall member 6 in place. The ribs 20 are slotted along their entire length to permit free flow of the feed gas through annular space 7. Gas splitter 19 is a V-shaped member inserted in gas inlet 2 to direct the incoming gas into annular space 7 in both directions from inlet 2. In addition to directing the feed gas in both directions from inlet 2, splitter 19 prevents direct perpendicular contact of the feed gas with louvered wall member 6 which could result in plugging or partial plugging of the louvers in the area of direct perpendicular contact.

FIG. 3 of the appended drawings is an elevational view of vessel 1 partially cut away to show the interior arrangement in greater detail, in particular, the details of the conical closure 15 at the lower end of cylindrical wall member 9, slot 16 and exterior guard ring 17.

FIG. 3 shows a particularly desirable and effective construction of the conical bottom of vessel 1. The bottom is formed of two trusto-conical members 27 and 28. The upper frusto-conical section 27 has relatively steep sidewalls, its elements being at angle from 65° to 90° relative to the horizontal, while frusto-conical section 28 has sidewalls which are less steep, its elements being at an angle of 45° to 70° relative to the horizontal. This arrangement of the two frusto-conical sections permits smooth, uninterrupted flow of the particulate solid contact material 14 from the annular space between cylindrical sidewall members 6 and 9 to solids outlet opening 4. This flow is achieved in this manner with a reduction in the overall height of vessel 1 from what its height would be if a single steep wall frusto-conical structure were employed to get dependable flow of the solid particulate contact material.

To insure that particulate solid material passing through the louvers of cylindrical wall 6 and dropping to the bottom of annular space 7 flows down and out of outlet opening 4 instead of accumulating in annular space 7 the distance $b$ between the lower end of wall 9 and conical surface 27 should not exeeed about ten times the distance $a$ between the lower end of wall 6 and conical surface 27. Put another way, wall 9 should extend downward in the vessel to a point sufficiently below the lower end of wall 6 that a line joining the lower end of wall 6 to the lower end of wall 9 has a steeper angle to the horizontal than the angle of repose of the particulate solid contact material. The line referred to would, of course, be the shortest line that would connect a given point on the lower end of wall 6 with a point on the lower end of wall 9.

To further facilitate the flow of contact material from annular space 7 to solids outlet 4, the lower portion of cylindrical wall 6 is bent inwardly at the bottom 29. The purpose and effect of this bend is more particularly described with reference to FIG. 6.

FIGS. 4 and 5 of the drawings show the detail of the louvered surface of first cylindrical wall member 6 and a section of the louvered wall. The surface of the cylindrical wall member is perforated by staggered rows of louvers 24, as shown. Louver vanes 25 slant outwardly from the surface wall member 6 and are inclined to the vertical at an angle from about 15° to 80°, preferably 30° to 50°. Louver openings 26 are sufficiently large so that essentially all of the particles constituting a mass solid contact material 14 are capable of passing through them. The walls of a second cylindrical wall member are similarly louvered but the louver vanes extend inwardly from the cylindrical wall member. Louver openings of 0.1 to 0.5 inches are preferred since they assist in maintaining the desired small flow of particles making up the mass of solid contact material which, for most applications, range in size from about 2 mm. to 12 mm. in diameter. Since the louver vanes are formed by perforating the cylindrical wall, the upper end of the vanes lies below the top of the louver opening by a distance $d$ which varies with the vane angles.

Many of the gases containing entrained solids which may be treated pursuant to the invention to remove the solids have high water vapor content ranging up to about 30 weight percent. When gases of this character are being processed, it is necessary to maintain the temperature of the interior of vessel 1 and of the particulate contact material 14 at a temperature above the dewpoint of the feed gas. In order to maintain above-dewpoint temperatures in the separating system, it is desirable to insulate at least lower frusto-conical section shown in FIG. 3, the first solid transport means 11 and the lower portion of elevator 10.

FIG. 6 of the drawings is the detail of the lower portion of cylindrical wall 6. When a filter unit is built with cylindrical wall 6 as a vertical wall which terminates vertically at the lower portion of the vessel so that the end of the vertical wall lies between the solid contact material which fills the annular space between cylindrical walls 6 and 9 and the solid contact material which accumulates in annular space 7 between vessel wall 1 and cylindrical wall 6 as a result of passage of the solid contact material through the louvers of cylindrical wall 6, flow of the contact material out of annular space 7 into the lower portion of the vessel and finally out of solids outlet opening 4 is very slow. Solid contact material tends to accumulate in annular space 7 and build up in that space blocking the louver openings in the lower part of louvered wall 6. The effect of this is to reduce the area of louvered wall 6 through which the feed gas can flow into contact with the solids contact material lying between walls 6 and 9. It has been found that this problem can be overcome by bending the lower portion (2 to 6 inches) of louvered wall 6 inwardly at an angle of 20° to 70°. The bent portion of the wall is shown as 29 in the drawing. Instead of bending the lower 2-6 inches of the louvered wall 6 inwardly, a solid metal plate (not shown) may be attached to the bottom of wall 6 to slope inwardly at 20° to 70° to the vertical. Either bending wall 6 as indicated or attaching the inwardly inclined solid plate provides the desired improved flow. The effect of placing this bent portion of louvered wall 6 (designated as 29) between the solid contact material lying between cylindrical walls 6 and 9 and the solid contact material which has accumulated in annular space 7 is to cause free flow of the material accumulated in annular space 7 into the lower portion of the vessel and out solids outlet 4. The accumulation of solid contact material in annular space 7 and the resultant blockage of the louver openings in the lower portion of cylindrical wall member 6 is prevented.

FIG. 7 shows the detail of a cross-section of the annular mass of solid contact material and the supporting walls taken along the central section of the vessel. The size of the solid particulate contact material with which the space between cylindrical walls 6 and 9 is filled may be varied depending on the character of the feed material. Where the finely divided solid particles contained in the feed are very small, it is preferred to use relatively smaller solid particulate material such as 6 to 8 U.S. sieve size. Difficulties have been experienced during the use of the smaller sized solid contact material resulting from a semi-fluidizing of the contact material particles in the vicinity of cylindrical wall 9 and the resultant rapid flow of the contact material particles through the louvers of wall 9. This rapid flow of contact material through the louvers results in the accumulation of contact material particles at the bottom of the interior of cylindrical wall member 9, the particles build up in this interior and block off the louver openings in the lower portion of cylindrical wall member 9 thus reducing the effective use of a substantial part of the contact material lying in the lower portion of the annular space between wall members 6 and 9. This accumulation requires periodic interruption of operation to remove the accumulated contact material with a resultant loss in operating factor. This problem of carry over solid contact material of small size through the louver openings of wall member 9 was overcome by placing a third cylindrical wall member having a diameter 1 to 10 inches greater than that of cylindrical wall member 9 in the vessel between wall members 6 and 9. The surface of this third cylindrical wall member is perforated with perforations of a size sufficient to permit passage of essentially all of the particles of solid contact material through them, the perforations covering the surface of third cylindrical wall member 18 cover the greater part of its surface but the perforations are preferably terminated at the upper end of wall member 18 at a point such that the highest of the perforations lay several inches below the highest of the louver vanes in wall member 9. The employment of wall member 18 as described eliminated the fluidization of the solid contact material particles and reduced their rate of flow through the louvers of wall member 9 with a resultant increase in the operating factor of the filter.

FIG. 8 of the drawings is the detail of the upper portion of the vessel showing the arrangement of the louver openings in wall 6 relative to the position of the louver openings in cylindrical wall 9. When the vessel is so constructed that wall members 6 and 9 are so louvered, that the uppermost louvers in wall 6 lie opposite the uppermost louvers in wall 9, a rapid flow of solid contact material through the upper louvers in wall 9 was observed. This rapid flow resulted in accumulation of solid contact material in the interior of cylindrical wall 9, a build up of this material at a rate which may slow up its exit through opening 16 with consequent blockage of the louver openings in the lower portion of wall 9. The observed rapid flow of the solid contact material through the upper louvers of wall 9 appears to be due to the fact that the feed gas entering the mass of contact material 14 through the upper louvers of wall 6 travels not only horizontally to escape through the louvered openings of wall 9, but also to travel upwardly in the contact material residing above the louvered portions of the two walls. This upper travel continues until the pressure resistance of the contact material causes it to turn downward and ultimately exit through the upper louvers of wall member 9. The result of this is that the gas flow rate through the upper louvers of wall 9 is much greater than the rate through the louvers in the intermediate portion of wall 9. This higher rate of gas flow simply carries an excessive amount of solid contact material through the upper louvers of wall 9. This difficulty was overcome by blocking off the louvers in the upper portion of wall 6 so that the topmost louver remaining in wall 6 lay below the topmost louver in wall 9 by a distance in the range about 6 to 18 inches and preferably about 12 inches. This arrangement of the relative position vertically of the louvers in the upper parts of wall members 6 and 9 is such that a solid unlouvered surface constitutes the upper part of wall 6 and this unlouvered surface faces an upper louvered surface of wall 9. This arrangement of the relative vertical positions of the topmost louvers in walls 6 and 9 prevented the rapid flow of solid contact material through the upper louvers of wall 9 and the accumulation of this overflow material in the interior of cylindrical wall 9 and eliminated the need for occasional shut downs with loss in operating factor to remove the accumulated solid contact material from the interior of cylindrical wall 9.

OPERATION

Gases containing finely divided solids which can be treated for solids removal pursuant to the invention come from a variety of sources. Stack gases from boilers fired with waste fuel and gaseous streams containing entrained solids formed in cement plants or lime kilns are illustrative feeds. Separation is effective whether the suspended finely divided solids are of high or low density and efficient separation of solids having diameters of about 0.5 microns is obtained.

The material constituting the mass of particulate solid contact materials through which the feed gas passes should be temperature resistant at the temperature of the feed gas, preferably has rounded rather than angular surfaces to facilitate flow and prevent bridging and the particles should have reasonable uniformity in size. Particle sizes preferably range from about 2 mm. diameter to 12.5 mm. diameter. A mass of particles in which the largest particles present in substantial quantity have diameters not more than 3 to 4 times the diameter of the smallest particles present in substantial quantity is considered a reasonably uniform mass and exhibits good flow properties in the system. Coarse beach sand or finely divided gravel are cheap, readily available and constitute excellent contact masses. A San Simeon sand containing 8 percent U.S. sieve size #6, 62 percent U.S. sieve size #7, and 30 percent U.S. sieve size #8 is a satisfactory coarse beach sand. Fine gravel consisting of 66 percent U.S. sieve size #4 particles, 26 percent U.S. sieve size #5 particles, and the remainder only slightly larger than #4 and slightly smaller than #6 is a suitable fine gravel for use in the process. In the event that gas at very high temperature is to be treated then metal shot, ceramic or quartz beads and similar materials which are more resistant to temperature fracture than sand or gravel should be used as the solid contact material.

Flow rates of the feed gas through the particulate solid mass ordinarily range from about 50 to 200 feet per minute. This velocity range is not critical and velocity can be varied over a considerable range as target levels of plant through-puts and efficiency of separation vary.

Pressure drop through the mass of solid particulate material is ordinarily in the range 2 to about 12 inches of water. Higher pressure drops are usually attended by higher efficiency of separation, but this is obtained at the cost of an increased energy requirement to drive the feed gas through the separation unit.

In addition to varying the rate at which the feed gas is passed through the mass of particulate solid material in a unit of the kind above-described, the rate at which the particulate solid is moved downward through the annular space between the two louvered cylindrical walls can be varied. The particulate solid can be moved at rates in the range about 0.5 to 40 feet per hour and can in addition be moved only intermittently. Higher flow rates are employed with feed gases heavily loaded with finely divided solid material. Lower flow rates or intermittent flow where the particulate may be moving during as little as one-sixth of the operating period may be employed where the feed gas is lightly loaded with finely divided solids or when a very high percentage removal of the finely divided solid is desired.

The method and apparatus can be operated over a wide range of pressure. Finely divided solids contained in stack gases at near atmospheric pressure or in gases effluent from coal gasification units or refuse combustion disposal units which may be at 100 psi or above, can be effectively removed.

A prototype separation unit having a design capacity of 40,000 actual cubic feet per minute was installed at a lumber mill in Washington to process stack gases from a powerhouse boiler fired with hog fuel. The unit corresponded in general design to that illustrated in FIG. 1 of the drawings, except that the gas inlet was positioned about mid-way between the top and bottom of the vessel and the bottom of the vessel had the double tapered conical bottom section illustrated in FIG. 3 of the drawings. The particulate solid material employed was ⅛–¼ size. This unit as installed did not have the modifications shown in FIGS. 6, 7 and 8. The annular mass of particulate solid materials had a thickness of 18 inches and a height of 16 feet. The rate of flow of the mass of particulate solid material downwardly through the annulus between cylindrical wall members 6 and 9 shown in FIG. 1 was 1 foot per hour. At this rate, there was a slow, steady flow of a minor proportion of the particular solid material through the louvers of cylindrical wall member 6 into annular space 7 and thence to the bottom of the vessel and a similar slow flow of particulate solid through the louvers of the second cylindrical wall member 9 into the space enclosed by that wall member and down to the conical closure at the bottom of cylindrical wall member 9. The flow of particulate solids through the louvers kept the louvered surfaces clean and free from deposits of the finely divided solids entrained in the gas feed. No louvered blockages or serious pressure drop increases due to accumulation of solids contained in the feed were experienced.

During operation of this and other units and operations of a pilot scale unit, the problems to which the modifications of the apparatus described with reference to FIGS. 6, 7 and 8 were observed. By altering the rate of flow of the solid particulate matter downwardly through the annular space lying between louvered cylindrical walls 6 and 9 as shown in FIG. 1 or by decreasing the gas feed rate or by both, it was possible to cope with the problems to a degree that made it possible to avoid frequent shutdowns. Meeting these problems in this manner was obviously inefficient. Reducing the gas flow rate reduced the useful capacity of the units and more rapidly circulation of the solid particulate matter increased operating costs since unnecessarily large quantities of solid particulate material were being moved.

The modifications of the filter apparatus described in FIGS. 6 and 8 have been tested in commercial scale apparatus and the modification of FIG. 7 in pilot scale apparatus and have overcome the problems above-described and have resulted in a smooth, steady state operation in which highly effective removal of finely divided solid particles from gases was achieved.

What is claimed is:

1. In an apparatus for separating finely divided solids from gas comprising:
   (a) a generally cylindrical vessel having a gas inlet opening in its side wall, a gas outlet opening centrally disposed in its top, a solids outlet centrally disposed in its bottom and at least one solids inlet opening disposed in its top laterally from the gas outlet opening,
   (b) a first generally cylindrical wall member having a diameter less than that of the vessel and disposed in the vessel to provide an elongated annular space between said first wall member and the wall of the vessel and in sealing engagement with the top portion of the vessel, and the annular space between the first wall member and the wall of the vessel being unobstructed and in open communication with the solids outlet at the bottom of the vessel,
   (c) a second generally cylindrical wall member having a diameter less than said first wall member disposed in said first wall member to provide an elongated annular space between the two wall members, the space enclosed by said second wall member being in open communication with the gas outlet opening in the top of the vessel and with the solids outlet at the bottom of the vessel,
   (d) a mass of particulate solid contact material filling the annular space between the two cylindrical wall members from the upper end of the second cylindrical wall member to the lower portion of the vessel, said mass being in open communication with the solids outlet opening, and
   (e) the surfaces of both cylindrical wall members being louvered surfaces formed by perforating said walls to form louver vanes inclined to the vertical at an angle of about 15° to 80° and having louver openings sufficiently large that essentially all of the particles constituting the contact mass are capable of passing through the openings, the louver vanes of the first cylindrical wall member extending outwardly and those of the second cylindrical wall member extending inwardly,
   (f) the improvement wherein a short portion of the lower end of the first wall member is bent inwardly so that the bent portion is inclined to the vertical at an angle of about 20° to 70°.

2. In an apparatus for separating finely divided solids from gas comprising:
   (a) a generally cylindrical vessel having a gas inlet opening in its side wall, a gas outlet opening centrally disposed in it top, a solids outlet centrally disposed in its bottom and at least one solids inlet opening disposed in its top laterally from the gas outlet opening,
   (b) a first generally cylindrical wall member having a diameter less than that of the vessel and disposed in the vessel to provide an elongated annular space between said first wall member and the wall of the vessel and in sealing engagement with the top portion of the vessel, and the annular space between the first wall member and the wall of the vessel being unobstructed and in open communication with the solids outlet at the bottom of the vessel,
   (c) a second generally cylindrical wall member having a diameter less than said first wall member disposed in said first wall member to provide an elongated annular space between the two wall members, the space enclosed by said second wall member being in open communication with the gas outlet opening in the top of the vessel and with the solids outlet at the bottom of the vessel, (d) a mass of particulate solid contact material filling the annular space between the two cylindrical wall members from the upper end of the second cylindrical wall member to the lower portion of the vessel, said mass being in open communication with the solids outlet opening, and (e) the surfaces of both cylindrical wall members being louvered surfaces formed by perforating said walls to form louver vanes inclined to the vertical at an angle of about 15° to 80° and having louver openings sufficiently large that essentially all of the particles constituting the contact mass are capable of passing through the openings, the louver vanes of the first cylindrical wall member extending outwardly and those of the second cylindrical wall member extending inwardly, (f) the improvement wherein a perforated third cylindrical wall member having a diameter of 1 to 10 inches greater than the diameter of the second wall member is disposed between the first and second wall members, the perforations of said third wall member being sufficiently large to permit essentially all of the solid contact material particles to pass through them.

3. An apparatus for separating finely divided solids from gas comprising:

(a) a generally cylindrical vessel having a gas inlet opening and a gas outlet opening in its surface, and (b) a filter element for use in separating finely divided solids from gas positioned in said vessel between said gas inlet opening and said gas outlet opening and comprising an elongated mass of particulate solid contact material disposed between two concentric cylindrical walls, one being an inner wall and the other an outer wall with respect to each other, the outer cylindrical wall having a louvered surface formed by perforating said wall to form outwardly extending louver vanes and the inner cylindrical wall having a louvered surface formed by perforating said wall to form inwardly extending louver vanes, the louver vanes of both walls being at angles of about 15° to 85° to the vertical and the louver openings in both walls being sufficiently large that essentially all of the solid contact material particles are capable of passing through them and the upper surfaces of the two cylindrical walls being so louvered that the louvered portion of one of said walls extends above the louvered portion of the other of said walls so that a solid unlouvered surface of the upper part of one of said walls faces an upper louvered surface of the other wall.

4. In an apparatus for separating finely divided solids from gas comprising:

(a) a generally cylindrical vessel having a gas inlet opening in its side wall, a gas outlet opening centrally disposed in its top, a solids outlet centrally disposed in its bottom and at least one solids inlet opening disposed in its top laterally from the gas outlet opening, (b) a first generally cylindrical wall member having a diameter less than that of the vessel and disposed in the vessel to provide an elongated annular space between said first wall member and the wall of the vessel and in sealing engagement with the top portion of the vessel, and the annular space between the first wall member and the wall of the vessel being unobstructed and in open communication with the solids outlet at the bottom of the vessel, (c) a second generally cylindrical wall member having a diameter less than said first wall member disposed in said first wall member to provide an elongated annular space between the two wall members, the space enclosed by said second wall member being in open communication with the gas outlet opening in the top of the vessel and with the solids outlet at the bottom of the vessel, (d) a mass of particulate solid contact material filling the annular space between the two cylindrical wall members from the upper end of the second cylindrical wall member to the lower portion of the vessel, said mass being in open communication with the solids outlet opening, and (e) the surfaces of both cylindrical wall members being louvered surfaces formed by perforating said walls to form louver vanes inclined to the vertical at an angle of about 15° to 80° and having louver openings sufficiently large that essentially all of the particles constituting the contact mass are capable of passing through the openings, the louver vanes of the first cylindrical wall member extending outwardly and those of the second cylindrical wall member extending inwardly, (f) the improvement wherein the upper portion of the first cylindrical wall member is unlouvered, not perforated, and the second cylindrical wall member has an upper surface which has a louvered portion which faces the unlouvered portion of the first wall member.

* * * * *